(12) United States Patent
Bansal et al.

(10) Patent No.: US 12,124,354 B2
(45) Date of Patent: Oct. 22, 2024

(54) SYSTEMS AND METHODS FOR ISOLATING TRANSACTIONS TO A PSEUDO-WAIT-FOR-INPUT REGION

(71) Applicant: BMC Software, Inc., Houston, TX (US)

(72) Inventors: Sagar Rajendraprasad Bansal, Pune (IN); Loc Dinh Tran, McLean, VA (US); Graham Fox, Trinity, TX (US)

(73) Assignee: BMC Software, Inc., Houston, TX (US)

( * ) Notice: Subject to any disclaimer, the term of this patent is extended or adjusted under 35 U.S.C. 154(b) by 417 days.

(21) Appl. No.: 17/656,557

(22) Filed: Mar. 25, 2022

(65) Prior Publication Data

US 2023/0305941 A1  Sep. 28, 2023

(51) Int. Cl.
*G06F 9/44* (2018.01)
*G06F 11/34* (2006.01)
*G06F 16/28* (2019.01)

(52) U.S. Cl.
CPC ........ *G06F 11/3495* (2013.01); *G06F 16/285* (2019.01)

(58) Field of Classification Search
CPC .................................................. G06F 11/3495
USPC ......................................................... 718/100
See application file for complete search history.

(56) References Cited

U.S. PATENT DOCUMENTS

| | | | |
|---|---|---|---|
| 6,571,270 B1* | 5/2003 | Lai | G06F 9/466 718/101 |
| 2009/0144409 A1* | 6/2009 | Dickerson | G06F 11/3495 709/224 |
| 2018/0203728 A1* | 7/2018 | Yan | G06F 11/0757 |
| 2022/0300887 A1* | 9/2022 | Cuartero | G06Q 10/06315 |

* cited by examiner

*Primary Examiner* — Timothy A Mudrick
(74) *Attorney, Agent, or Firm* — Brake Hughes Bellermann LLP

(57) ABSTRACT

The system and techniques described herein include receiving a transaction report from a log dataset, where the transaction report includes a class identifier (ID) for each of the transactions, a transaction execution count, and a total transaction response time. A first listing of the transactions is generated. An average number of unique transactions assigned to all of the classes and an average transaction execution count are calculated. A second listing of the transactions is generated that includes all of the transactions for the class IDs where the count of unique transactions assigned to the class is greater than the average number of unique transactions assigned to all of the classes. For each class ID and transaction name, the second listing is updated to identify one or more of the transactions as candidate transactions for running in a P-WFI region when the conditions are met.

21 Claims, 12 Drawing Sheets

300

| Sr no | Values for | |
|---|---|---|
| b.i | IMS region ID | 302 |
| b.ii | Region Name | 304 |
| b.iii | Transaction Name (Transaction Name/program summary record) | 306 |
| b.iv | Region Type (WFI/PWFI/Blank) | 308 |
| b.v | Class ID | 310 |
| b.vi | Program schedule count | 312 |
| b.vii | Transaction execution count | 314 |
| b.viii | Transaction accessing Db2 flag | 316 |
| b.ix | Total schedule to $1^{st}$ DLI CPU | 318 |
| b.x | Total schedule to $1^{st}$ DLI time | 320 |
| b.xi | Total transaction response time | 322 |
| | Total system elapsed time | 324 |

| 1. | Dedicated region Flag | Y/N |
|---|---|---|
| 2. | Transaction name | Tran name |
| 3. | Program name | PGM name |
| 4. | CLASS | Class ID |
| 5. | Db2 Access Flag | Y/N |
| 6. | Reassign class flag | Y/N |
| 7. | Schedule time percent of total response time | ((2.b.x Total schedule to $1^{st}$ DLI time)(2.b.xi Total transaction response time)) * 100 |
| 8. | Number of dedicated regions recommended | Value calculated in 11.c |

FIG. 4

| TRAN_NAME | PGM NAME | CLASS | Db2_Access | Class reassign... | Recommended dedicated regions | PGM SCH # | NUMBER of RGN | Total region occupancy | Schedule time percent | Total IST DLI CPU | Total IST DLI Time | Total Response Time | TRAN # | Recommended dedicated region |
|---|---|---|---|---|---|---|---|---|---|---|---|---|---|---|
| TRAN1 | PROG1 | 76 | Y | Y | 3 | 1818 | 12 | 75.57826191 | 13.97511239 | 1.647847 | 10.856573 | 77.580027 | 1850 | Y |
| TRAN2 | PROG2 | 70 | Y | N | 3 | 1500 | 4 | 86.77712201 | 5.260410444 | 1.38049 | 4.50068 | 89.0755 | 1512 | |
| TRAN3 | PROG3 | 76 | Y | Y | 2 | 904 | 10 | 25.76906773 | 19.69856191 | 0.827294 | 5.211327 | 26.451587 | 919 | |
| TRAN4 | PROG4 | 76 | Y | Y | 2 | 758 | 7 | 26.95581359 | 17.49649666 | 0.683819 | 4.769727 | 27.669765 | 769 | |
| TRAN5 | PROG5 | 43 | Y | Y | 2 | 414 | 5 | 18.78995192 | 15.79340167 | 0.395243 | 3.044596 | 19.284235 | 421 | |
| TRAN6 | PROG6 | 44 | Y | Y | 3 | 1018 | 3 | 96.74559708 | 0.403531771 | 0.271642 | 0.387219 | 99.308 | 1104 | |
| TRAN7 | PROG7 | 44 | Y | Y | 2 | 231 | 3 | 6.04805332 | 11.16745984 | 0.231126 | 0.690284 | 6.208242 | 244 | |
| TRAN8 | PROG8 | 90 | N | Y | 2 | 864 | 9 | 1.957455844 | 13.00000374 | 0.22814 | 0.260056 | 2.009301 | 883 | |
| TRAN9 | PROG9 | 102 | N | Y | 2 | 211 | 1 | 1.802775701 | 15.51927994 | 0.119323 | 0.287188 | 1.850524 | 212 | |
| TRAN10 | PROG10 | 3 | N | Y | 2 | 518 | 3 | 15.82093078 | 1.906703949 | 0.111973 | 0.154395 | 15.932018 | 523 | |
| TRAN11 | PROG11 | 4 | Y | Y | 2 | 391 | 3 | 8.515603803 | 6.848672274 | 0.111583 | 0.572803 | 8.741148 | 395 | |
| TRAN12 | PROG12 | 17 | Y | Y | 2 | 393 | 2 | 5.648387856 | 4.816132963 | 0.105724 | 0.277591 | 5.797991 | 396 | |
| TRAN13 | PROG13 | 3 | Y | Y | 2 | 413 | 1 | 7.116910578 | 1.333860979 | 0.082887 | 0.097444 | 7.305409 | 415 | |
| TRAN14 | PROG14 | 32 | N | Y | 2 | 408 | 1 | 3.598777807 | 2.859563709 | 0.080832 | 0.105635 | 3.694095 | 409 | |
| TRAN15 | PROG15 | 102 | N | N | 2 | 126 | 1 | 0.572696565 | 24.03885246 | 0.070328 | 0.141316 | 0.587865 | 127 | |
| TRAN16 | PROG16 | 28 | Y | Y | 2 | 188 | 1 | 1.538215831 | 4.866376982 | 0.042435 | 0.076838 | 1.578957 | 189 | |
| TRAN17 | PROG17 | 90 | N | Y | 2 | 140 | 1 | 0.226425886 | 19.74546409 | 0.041392 | 0.045893 | 0.232423 | 142 | |

Assign below high frequency reentrant transactions to dedicated class and define it to be running as WFI or schedule the class to MPR running as PWFI Reassignment id:1

Transaction XXXXXXXX running under class XY spends 13.975 of response time in scheduling the transaction.

This transaction needs to be defined as WFI on TRANSACT macro and regened. It can be reassigned to class AB and we can have 3 MPR's running dedicatedly for this class having average region occupancy of 26%

This transaction access Db2 and is very strongly recommended to be run as WFI. Above reassignment could reduce average response time of transaction XXXXXXXX approximately by 10% and CPU reduction by ZZ units.

FIG. 6

First Table (Table 1) 800

| Class Id | Count of unique transactions assigned to the class | Sum of transaction execution count for this class | Sum of total response time in seconds |
|---|---|---|---|
| Class 1 | 8 | 750,045 | 185.40 |
| Class 3 | 2 | 1,500,874 | 125.58 |
| Class 7 | 10 | 500,000 | 100.12 |
| Class 10 | 15 | 100,000 | 75.50 |
| Class 12 | 1 | 1,200,000 | 100.52 |

FIG. 8

Second Table
(Table 2) 900

| Class Id | Transaction name | Total transaction execution count for each transaction name | Total response time | Total transaction schedule count | P-WFI flag |
|---|---|---|---|---|---|
| Class 1 | Tran 1 | 200,000 | 52.00 | 185,215 | - |
| Class 1 | Tran 5 | 212,000 | 50.00 | 175,000 | - |
| Class 1 | Tran 12 | 115,000 | 20.00 | 112,000 | - |
| Class 1 | Tran 20 | 100,000 | 15.25 | 98,000 | - |
| Class 1 | Tran 30 | 45,000 | 15.15 | 45,000 | - |
| Class 1 | Tran 10 | 20,000 | 14.00 | 20,000 | - |
| Class 1 | Tran 15 | 49,000 | 12.00 | 45,000 | - |
| Class 1 | Tran 50 | 9.045 | 7.00 | 90,045 | - |

FIG. 9

Updated Second Table (Updated Table 2) 1000

| Class Id | Transaction name | Total transaction execution count for each transaction name | Total response time | Total transaction schedule count | P-WFI flag |
|---|---|---|---|---|---|
| Class 1 | Tran 1 | 200,000 | 52.00 | 185,215 | Y |
| Class 1 | Tran 5 | 212,000 | 50.00 | 175,000 | Y |
| Class 1 | Tran 12 | 115,000 | 20.00 | 112,000 | Y |

FIG. 10

SYSTEMS AND METHODS FOR ISOLATING TRANSACTIONS TO A PSEUDO-WAIT-FOR-INPUT REGION

TECHNICAL FIELD

This description relates to systems and methods for isolating high volume transactions (e.g., IBM®IMS™ database transactions) to a pseudo-wait-for-input (P-WFI) region from a group of transactions in a class.

BACKGROUND

Tuning the IBM®IMS™ database management software system (referred to throughout this document as IMS) is a difficult task. One of the most complex areas in tuning the IMS system is IMS transaction scheduling. An untuned IMS system can cause various issues, including transaction execution delay due to IMS regions not being available to schedule and the consumption of a greater number of central processing unit (CPU) cycles in the IMS control region (CTL) because the IMS scheduler has to search for an available region. In addition, for transactions that access an IBMDb2 data management product (referred to as Db2 throughout this document), a large amount of CPU cycles may be needed to create an environment newly accessed by Db2. Further, the untuned IMS system can also result in over-allocating system memory due to program preload, which causes paging in an operating system level. The untuned IMS system can also result in multiple additional input/output (I/O) cycles to load programs for scheduling. It is desirable to achieve improved IMS transaction scheduling through a technical solution to have a better tuned IMS system that avoids these negative technical problems.

Additionally, in a production IMS system, a class may be defined to handle low volume transactions. Usually, this class is served by multiple regions. Over time, the transaction volumes for the class may grow, and additional regions may be added to serve this class. Eventually, the number of regions may become too large to manage efficiently. Additionally, IMS scheduling may be inefficient and not optimized, which may cause and result in poor transaction response time and high CPU consumption. It is desirable to provide a technical solution to improve the scheduling of these transactions to improve response time and to improve CPU consumption.

SUMMARY

In one general aspect, the techniques described herein relate to a computer-implemented method, the computer-implemented method including: receiving a transaction report from a log dataset, the transaction report listing multiple transactions including a plurality of metrics for each of the transactions, wherein the plurality of metrics includes a class identifier (ID) for each of the transactions, a transaction execution count, and a total transaction response time; generating a first listing of the transactions indexed by the class ID for each class of a plurality of transactions, wherein the first listing includes from the plurality of transactions a count of unique transactions assigned to the class, a sum of the transaction execution count for the class, and a sum of the total transaction response time for the class; calculating an average number of unique transactions assigned to all of the classes from the first listing; calculating an average transaction execution count from the first listing; generating a second listing of the transactions indexed by class ID and transaction name, wherein the second listing includes all of the transactions for the class IDs where the count of unique transactions assigned to the class from the first listing is greater than the average number of unique transactions assigned to all of the classes from the first listing; and for each class ID and transaction name on the second listing of the transactions, updating the second listing of the transactions to identify one or more of the transactions as candidate transactions for running in a P-WFI region when a total transaction execution count is greater than the average transaction execution count from the first listing and the total transaction execution count is greater than a total transaction schedule count.

The techniques in the general aspect described above may be implemented as a computer-implemented method, a computer program product, or a system.

The details of one or more implementations are set forth in the accompanying drawings and the description below. Other features will be apparent from the description and drawings, and from the claims.

BRIEF DESCRIPTION OF THE DRAWINGS

FIG. 3 is an example report of the IMS system's scheduling statistics report.

FIG. 4 is an example summary recommendation report.

FIG. 5 is an example detailed recommendation report.

FIG. 6 is an example detailed recommendation report at the transaction level.

FIG. 8 is an example first table created as part of the process of FIG. 7.

FIG. 9 is an example second table created as part of the process of FIG. 7.

FIG. 10 is an example updated second table created as part of the process of FIG. 7.

DETAILED DESCRIPTION

Figure 1:
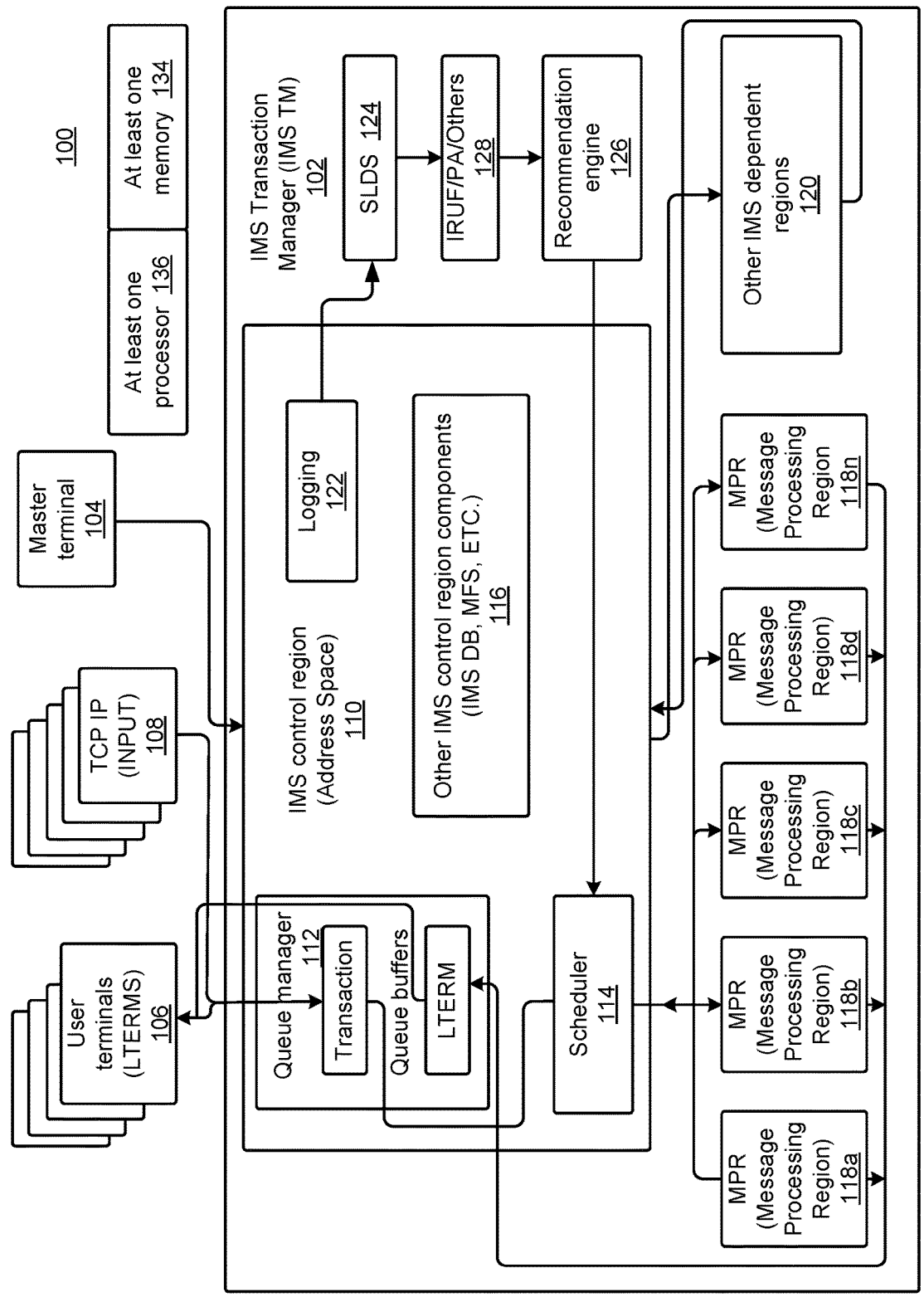
FIG. 1 is a block diagram of an example system for IMS transaction scheduling and processing.

This document describes systems and techniques for improved IMS transaction scheduling that results in a better tuned IMS system. In general, IMS is a hierarchical database management software system for online transaction processing (OLTP) and online batch processing that may process thousands, millions, billions, and up to trillions of transactions over a period of time (e.g., over a day, week, etc.). The IMS system is used in many different industries including, for example, banking, travel, healthcare, communication, automotive, retail, manufacturing, oil and gas, energy, as well as other industries. The IMS system includes the IMS transaction manager (IMS TM) that manages, schedules, and performs OLTP for applications that access IMS data as well as data stored in the Db2 database.

One aspect for tuning the IMS system is to improve the efficiency and scheduling of the IMS TM by defining transactions as wait-for-input (WFI) or defining regions as pseudo-wait-for-input (P-WFI). In other terms, defining transactions as WFI effectively allocates an IMS region or IMS address space as a WFI region for a selected transaction. Defining a region as running under P-WFI effectively allocates an IMS region or IMS address space as the P-WFI region. The WFI region or the P-WFI region defined for the selected transaction means that the selected region is already initialized to process additional transactions (or messages) identified to run on the selected region without having to reinitialize the region to process the additional transactions (or messages). When a transaction is defined as WFI, the IMS system starts the transaction running in the region and, upon completion of the execution of the transaction, the transaction remains in the region waiting for another same transaction or another message for the same transaction. In this manner, the transaction occupying the IMS region waits for the next message for the same transaction to execute without having to go through reinitialization and without having to reinitialize the IMS region to execute the next message.

A goal of IMS transaction scheduling is to find and schedule transactions as WFI or as running in P-WFI in an efficient manner so that once the transaction completes, the transaction can remain in the same region and execute the next transactions. A challenge to selecting and defining transactions as WFI or executing in the P-WFI region is the limited number of regions in the IMS system that can be occupied. Thus, not every IMS transaction can be defined as WFI or P-WFI due to the limited number of regions.

The systems and techniques described herein identify the limited number of IMS regions as WFI or P-WFI and thus improve IMS transaction scheduling by designating IMS transactions to run as WFI or running in the P-WFI region. IMS transaction response time and transaction queuing time are improved by intelligently recommending which transactions to assign as WFI or running in the P-WFI region and how many WFI or P-WFI regions are required for each reassigned transaction. By using IMS log dataset(s), the systems and techniques described herein analyse each transaction based on various criteria, including the CPU usage for scheduling, the elapsed time for schedule to a first Data Language Interface (DLI) call, the transaction elapsed time, class assignment, and other criteria. User input may be another criterion used to decide the eligibility for designating or recommending a transaction as WFI or running in the P-WFI region. These techniques result in an optimization for identifying which transactions to schedule as WFI and running in the P-WFI region and which IMS regions are WFI or P-WFI. In this manner, more efficient use of the IMS TM, including its components such as the IMS scheduler, and the resources the IMS scheduler are realized by consumers.

Additionally, the systems and techniques described herein reduce the need of experienced systems programmers to tune the IMS system, the time to analyse the data, and the guess work historically involved in designating transactions as WFI or running under the P-WFI region. The systems and techniques provide accurate suggestions for making changes to the system using precise metrics rather than guesswork. Using the described technical solutions for the above-identified technical problems results in multiple, realized improvements to the computing system. For example, the systems and techniques reduce transaction queue time since WFI transactions and/or transactions running under the P-WFI region do not go through complicated scheduling logic. The IMS program does not need to re-initialize and is ready to take on a new transaction. CPU consumption is reduced, especially for transactions accessing Db2 database resources, because once a transaction is designated as WFI, the IMS scheduler does not need to use CPU resources to schedule subsequent transactions that can be executed by the existing WFI transaction in a particular region. The systems and techniques described herein reduce input/output (I/O) cycles by not having to load the application programs because the application programs are already scheduled in the region. Additionally, the systems and techniques described herein improve response time for other processes and cycles as a result of the total time reductions when there are many IMS and Db2 transactions.

Further, the systems and techniques described herein allow systems programmers to pick out transactions that have high volume that is not high enough to warrant a separate message processing region (MPR). By grouping these high-volume transactions together and assigning them into a new class to run in a P-WFI environment, it is not necessary to add new MPRs for the new class, but rather, it is possible to reuse the existing P-WFI MPRs.

By doing this, the picked-out transactions will have a much higher chance to be scheduled without the scheduling overhead due to P-WFI and experience less interference from other low volume transactions. Therefore, CPU utilization by IMS and therefore transaction response time are reduced.

The following terms are used throughout this document:
PRSPGSCH—a program scheduling statistics report—this is a report that is created having multiple data points.
CSV—Comma separated values.
SLDS—an IMS system log data set—created by the IMS system to record the transactions occurring on the IMS system.
IRUF—an offline IMS resource utilization file for applications an example of which is BMC Software's BMC AMI Ops for IMS product.
REGION/MPR—an IMS Message processing region—this is a region or address space in the IMS system where transactions can be executed.
WFI—IMS Wait-for-input—a transaction that is designated as WFI and assigned to a message processing region (MPR) that it occupies for approximately the next 64,000 iterations. When those iterations are completed, the IMS scheduler schedules another WFI transaction having the same criteria as the MPR-occupying transaction for execution during the next iterations. When the transaction is scheduled as WFI, the IMS scheduler selects an available MPR, and the IMS scheduler loads the appropriate program(s), creates the environment, optionally loads the transmission control protocol/internet protocol (TCP/IP or TCP IP) input for Db2-based transactions in the selected MPR. The transaction executes in the MPR using the loaded resource and continues to occupy the MPR after execution of the transaction is completed. The scheduler places the MPR in a wait state and maintains the allocation. The scheduler only terminates the transaction if any of the following are true: The limit for the number of input messages processed or the processing time (PROCLIM) count is reached or a command to stop the MPR is entered.
P-WFI—IMS Pseudo-wait-for-input—a region or MPR-designated P-WFI enables a region to remain scheduled as the P-WFI region and process additional messages for the same transaction until another input message appears for a different transaction. When a transaction is scheduled as P-WFI, the IMS scheduler selects an available MPR, and the IMS scheduler loads the appropriate program(s), creates the environment, and optionally loads the TCP IP input for Db2-based transactions in the selected MPR. The transaction executes in the MPR using the loaded resource and continues to occupy the MPR after execution of the transaction is completed. The scheduler does not terminate the transaction when the transaction is completed. Instead, the scheduler maintains the region as P-WFI in a wait state for other transactions of the same class. When IMS needs the P-WFI region to schedule a transaction, IMS terminates the transaction and initializes the region for the new transaction.

Db2—IBM®Db2 Database

FIG. 1 is a block diagram of a portion of an example system 100 for IMS transaction scheduling and processing. The system 100 illustrates some components of the IMS system, including those components related to transaction scheduling and processing. It is understood by those skilled in the art that the system 100 may include other IMS components that are part of the IMS system, but that are not illustrated in this figure for simplicity of discussion.

The IMS system 100 includes an IMS transaction manager (IMS TM) 102. IMS TM 102 manages, schedules, and performs online transaction processing for applications that access the IMS system as well as data stored in the Db2 database. IMS TM 102 may process different types of IMS messages including, for example, transactions, message-switches and commands. Most types of IMS TM 102 IMS messages are in the form of transactions. Transactions may originate from various different sources depending on the type of industry or application using the IMS system. IMS TM 102 schedules and processes input messages from a variety of sources, processes messages sent outbound from IMS applications, and provides a message queuing and scheduling mechanism for messages in different message processing regions MPRs 118a-118n.

IMS TM 102 receives input from a master terminal 104, multiple user terminals 106 (also referred to as logical terminals (LTERMS) 106), and multiple TCP IP inputs 108. The master terminal 104, LTERMS 106, and TCP IP inputs 108 interact and exchange communications with IMS TM 102.

IMS TM 102 includes an IMS control region (address space) 110. IMS control region 110 controls how IMS makes data available to an end-user, controls a queue manager 112 to queue and manage transactions, and controls a scheduler 114 to schedule transactions for processing in one or more IMS regions. IMS control region 110 includes other IMS control region components 116 such as, for example, IMS DB, message format service (MFS), and other components. The queue manager 112 receives and stores messages, including transactions, by destination, priority, and the time of arrival in IMS. As discussed in more detail below, the scheduler 114 schedules the messages, including the transactions, for processing in the MPRs 118a-118n. A logging module 122 logs the transactions and stores the logged data in a system data log set (SLDS) 124. The recommendation engine 126 receives input from the SLDS 124 and data from the IMS resource utilization files (IRUFs), performance analyser (PA), and other files 128 to generate a recommendation for which transactions to designate as WFI and which regions to designate as P-WFI.

IMS TM 102 includes different types of IMS regions that are used to process messages. IMS TM 102 includes multiple message processing regions (MPRs) 118a-118n, which are the locations where transactions are processed in real time. Other IMS dependent regions 120 may include batch message processing regions, JAVA processing regions, IMS fast path regions, and other types of regions. In some implementations, IMS TM 102 may include for example, 999 MPRs 118a-118n, and in some implementations, IMS TM 102 may include a different number of MPRs 118a-118n. It is understood that while only 5 MPRs are illustrated in FIG. 1, the reference numbers 118a-118n are meant to convey any number of MPRs including for example, 999 MPRs or a different number of MPRs.

In some implementations, each of the MPRs 118a-118n may be allocated to handle one transaction. Thus, for an IMS TM 102 having for example, 999 MPRs, a total of 999 transactions may be schedule for concurrent, parallel processing.

The response time of each IMS transaction is a critical performance criterion for an IMS system. Various factors impact response time of IMS transactions, such as transaction queuing, program scheduling, program execution, IMS database access, Db2 database access, de-queue time, etc. Tuning of transaction scheduling is one of the ways to improve response time. Scheduling the transaction as WFI or regions as running P-WFI can reduce the schedule to the first DLI call time, significantly improving the overall response time of the transaction. The first DLI call time is the amount of time it takes for the scheduler to load a program from the library to storage until the loaded program makes a first DLI call to the IMS system for the transaction. Not all transactions can or should be scheduled as WFI or for running in a P-WFI region. Various factors need to be considered for scheduling transactions as WFI or for running in a P-WFI region. Currently, system programmers consider some data points to guess which transactions should be scheduled as WFI or for running in a P-WFI region. The system and techniques described herein take the guess work and risk of making the wrong call out of scheduling transactions in the IMS system.

The system 100 also includes at least one memory 134 and at least one processor 136. The at least one processor 136 may represent two or more processors in the system 100 executing in parallel and utilizing corresponding instructions stored using the at least one memory 134. The at least one processor 136 may include at least one central processing unit (CPU). The at least one memory 134 represents a non-transitory computer-readable storage medium. Of course, similarly, the at least one memory 134 may represent one or more different types of memory utilized by the system 100. In addition to storing instructions, which allow the at least one processor 136 to implement the IMS TM 102 and its various components, the at least one memory 134 may be used to store data and other information used by and/or generated by the IMS TM 102 and the components used by the IMS TM 102.

The techniques described below in FIGS. 2A-2C as implemented by the IMS TM 102 of FIG. 1, including the IMS control region 110, the queue manager 112, and the recommendation engine 126, analyse various data points as described below to generate WFI or P-WFI recommendations without adversely impacting resource utilization. This improves overall transaction response time and eliminates guess work and risk of making the wrong guess, as well as achieves the other advantages and improvements described throughout this document. In some implementations, the output of the process of FIGS. 2A-2C automatically schedules the transactions for WFI or regions running as P-WFI, as recommended, for processing and execution in one or more designated MPRs 118a-118n.

Figure 2A:
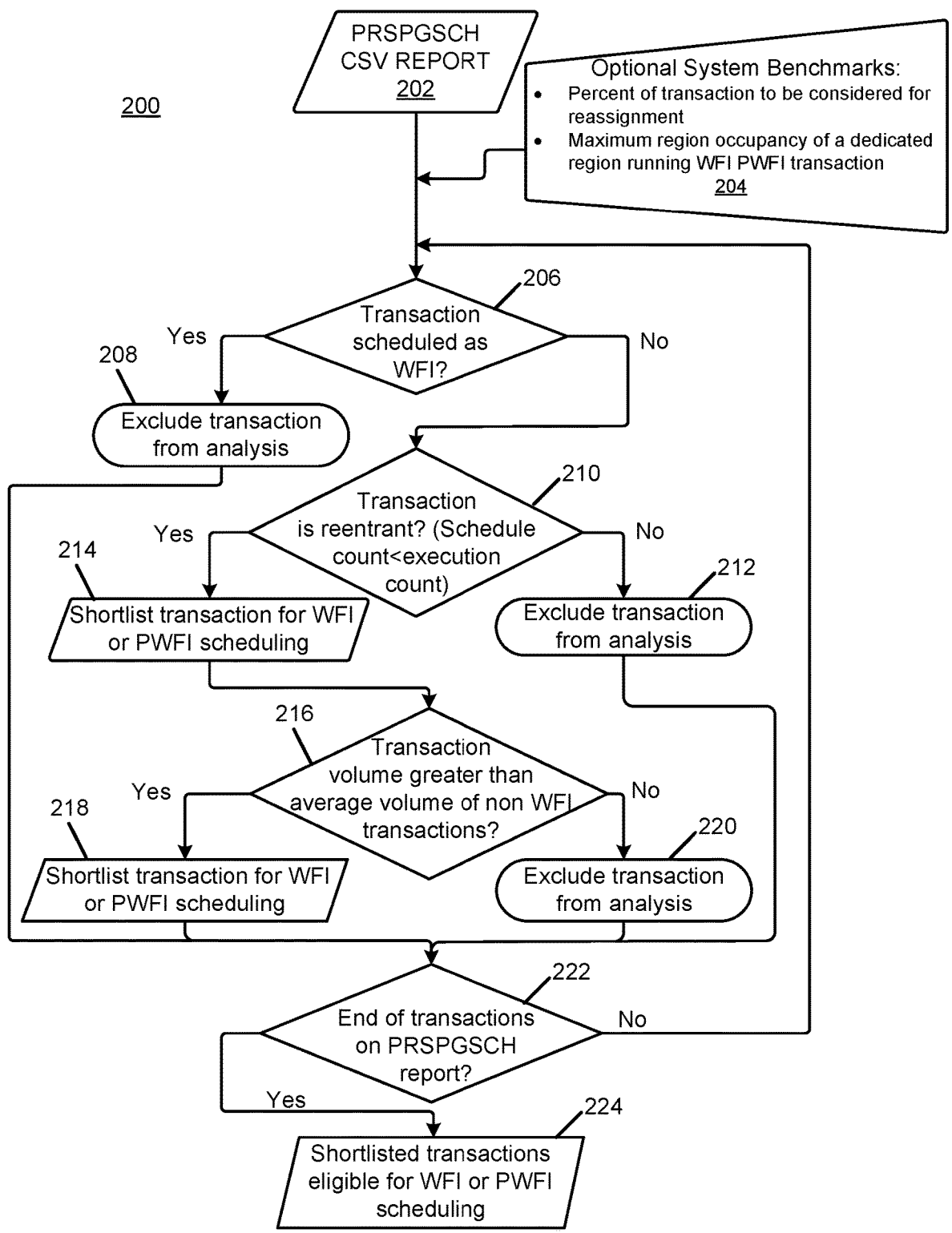
FIGS. 2A-2C illustrate an example flow diagram of a process for recommending transactions for scheduling as WFI or regions as P-WFI using the system of FIG. 1.
Figure 2B:
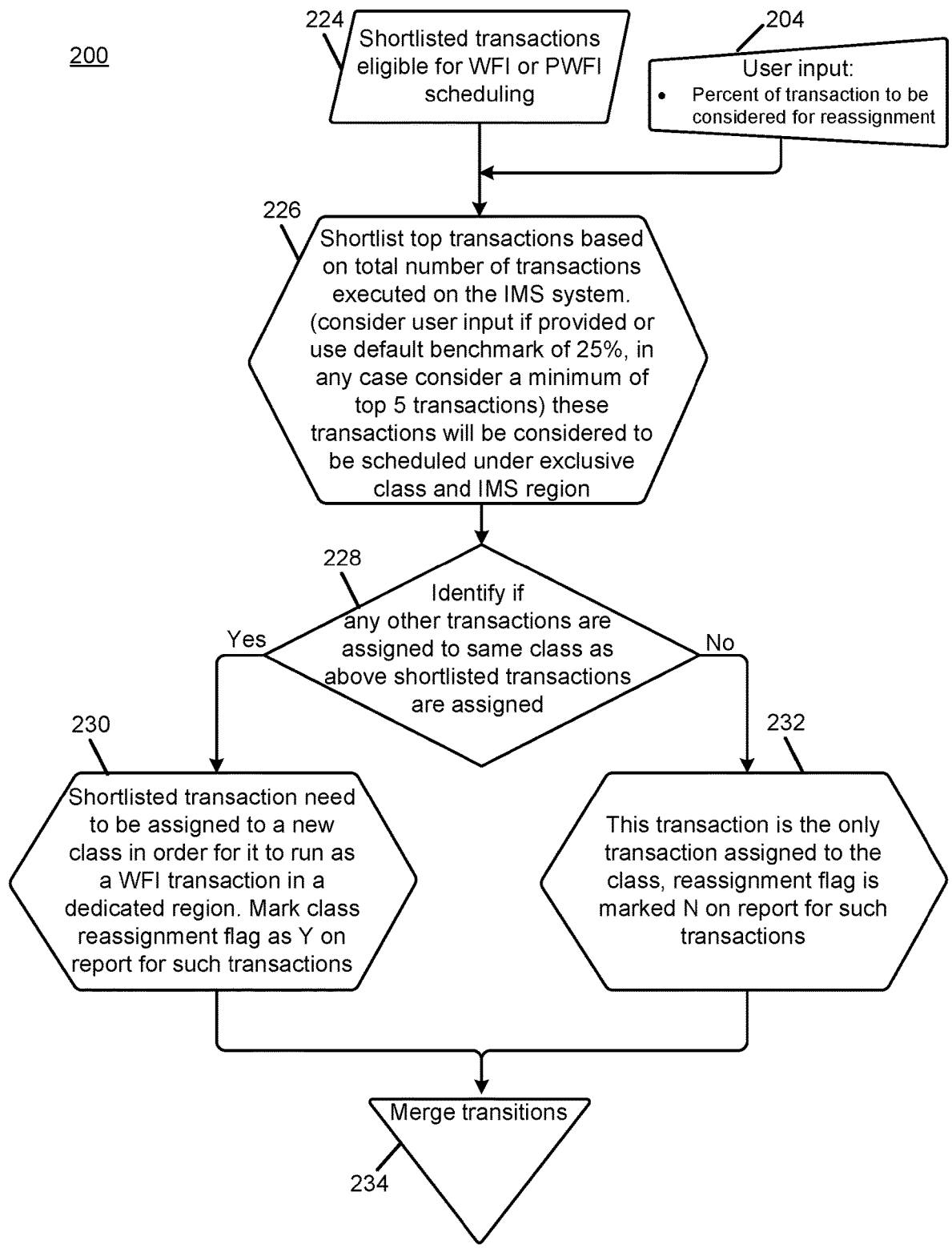
Figure 2C:
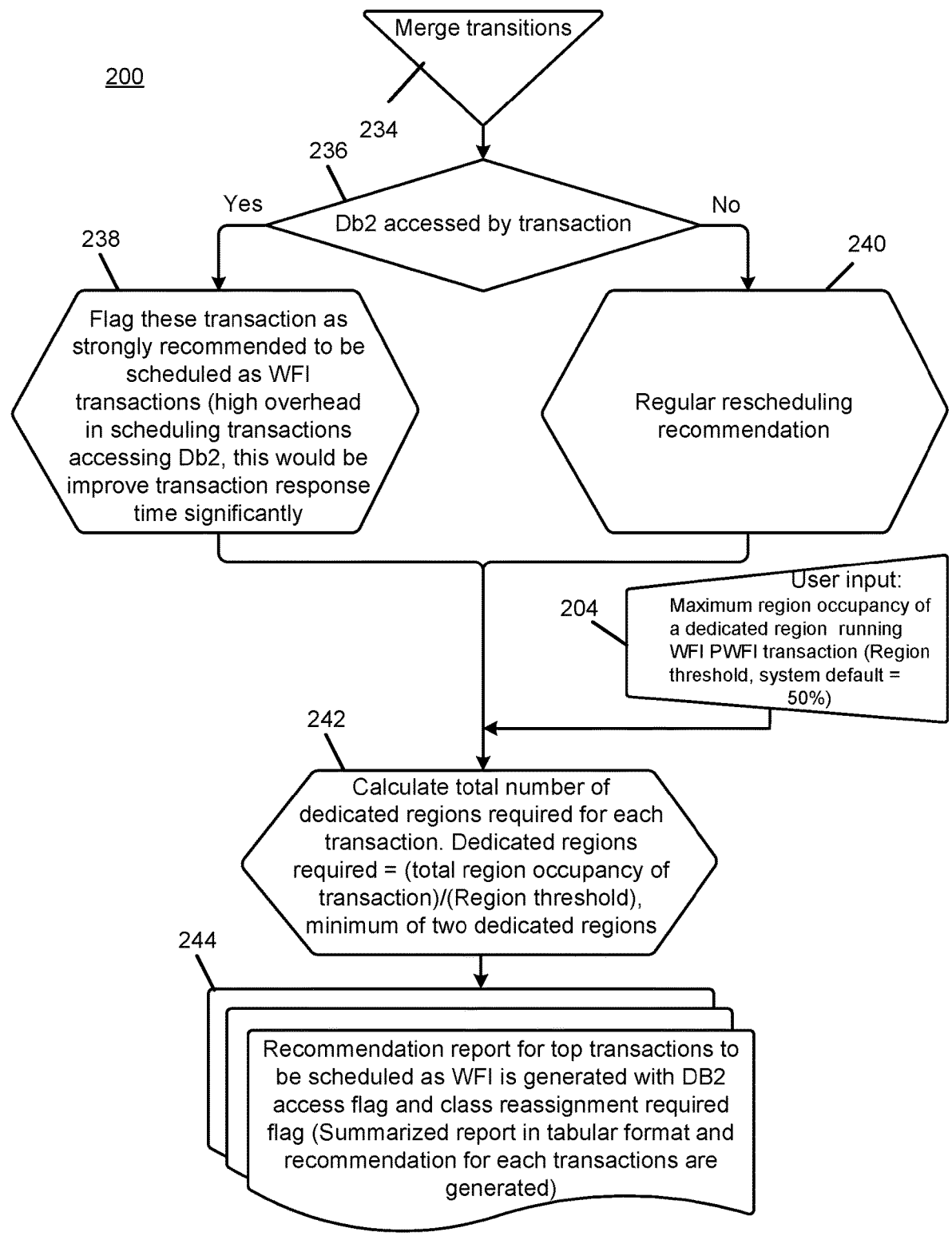

FIGS. 2A-2C illustrate a process 200 a process for recommending transactions for scheduling as WFI or regions running as P-WFI using the system of FIG. 1. Process 200 starts on FIG. 2A and continues onto FIGS. 2B and 2C.

Referring to FIG. 2A, a PRSPGSCH CSV report (202) in character separated value format (CSV) is used as an input for this process. The PRSPGSCH CSV report has the fields listed in example PRSPGSCH CSV report 300 (or report 300) of FIG. 3. In some implementations, other reports may be used or have the same or similar data as the report 300, including, for example, the IBM Performance Analyzer report, the IMS system's data communications (IMS/DC) monitor report, or other similar types of reports.

As illustrated in FIG. 3, the report 300 includes multiple data metrics. One metric includes a total duration for the input data being processed that is labelled Total System elapsed time 324. The first record of the CSV report has the start time of the first SLDS 124 log record and the end time of the SLDS log record from IRUF 128. For example, the total system elapsed time 324 may range from approximately multiple seconds to multiple hours to a day or to multiple days' worth of data for transaction processing. The recommendation engine 126 processes input data from SLDS 124 and IRUF 128 to find the total system elapsed time 324, where the total system elapsed time 324 equals the end time on the last SLDS 124 record minus the start time on the first SLDS 124 record.

The IMS region ID 302 is the identifier of the region, and the Region name 304 is the name of the region where the transaction exists. The transaction name 306 refers to a name of the transaction associated with the IMS region ID 302.

The region type 308 refers to the type of region that is designated for the transaction. For example, the type of region 308 may be designated as the WFI region, the P-WFI region, a non-designated or blank region, or other type of region.

The class ID 310 refers to the class identification for the transaction.

The program schedule count 312 refers to the number of schedules that take place in the MPRs 118a-118n for the transaction.

The transaction execution count 314 refers to the number of transactions that execute within a period of time in the MPRs 118a-118n.

The transaction accessing Db2 flag 316 provides an indicator of whether or not the transaction accesses the Db2 database. For example, if the flag is set (e.g., set to 1, True, etc.), then the transaction accesses the Db2 database. If the flag is not set (e.g., blank or set to 0, False, etc.), then the transaction does not access the Db2 database.

The total schedule to Pt DLI CPU 318 refers to a measure of the CPU resources that were consumed by the transaction during the period of time that starts when the scheduler retrieves the transaction from the queue manager until the Pt DLI call.

The total schedule to Pt DLI time 320 refers to an amount of time the transaction takes from the time the transaction entered the queue manager 112 through the time the IMS TM schedules one of the MPRs 118a-118n until the time the application performs a 1st DLI call.

The total transaction response time 322 refers to an amount of time the transaction takes as measured from the time the transaction enters the queue manager 112 until the time the transaction completes with an output.

The metrics in the report are used to determine which future transactions should be designated as WFI and regions as P-WFI.

As illustrated in the example report 300 in FIG. 3, there is one unique record for every IMS Region ID 302 and a specific transaction name 306 on the report 300.

In step 204, additional, optional system benchmarks may be input into the scheduler. In some implementations, a user may be prompted to enter and/or confirm these system benchmarks. In some implementations, the system benchmarks may be automatically included as system defaults that are input to the recommendation engine 126 without user prompting or user intervention. In some implementations, the system benchmarks may be system defaults that are dynamically modified using a machine learning module and process. Using a machine learning process, the values for the system benchmarks dynamically change over time in a manner that further optimizes the recommendation engine 126. The system benchmark values include: a) A percentage of transactions to consider for reassignment to the dedicated MPR from among MPRs 118a-118n (between 0-100%); and/or b) A maximum region occupancy of the dedicated MPR from among MPRs 118a-118n running a WFI transaction or running as P-WFI region (between 20-80%).

The report 300, in combination with the operational system benchmarks 204, report the transactions that can be scheduled as WFI or regions as running P-WFI to improve total transaction response time 322 by reducing the amount of time the scheduler 114 takes to schedule to the first DLI. The total transaction response time 322 is improved by the recommendation engine 126 using the inputs to improve scheduling to reduce the total schedule to Pt DLI time 320.

The recommendation engine 126 first determines if a new transaction is already scheduled as a WFI (206). That is, the recommendation engine 126 determines if a transaction is already allocated to an MPR from among MPRs 118a-118n. If the transaction is allocated to an MPR from among MPRs 118a-118n, then that transaction is excluded from the analysis (208). If the transaction is not already scheduled as a WFI transaction, then the transaction is processed for further analysis to determine if the transaction should be scheduled as a WFI transaction.

For a transaction not already scheduled as a WFI transaction, the recommendation engine 126 next determines whether or not the transaction is re-entrant (i.e., the schedule count is less than the execution count) (210). If the recommendation engine 126 determines that the transaction is not re-entrant, then the transaction is excluded from further analysis (212) and excluded from further consideration of being designated as a WFI transaction. In this manner, this avoids potential issues because if the non-re-entrant transaction is scheduled as a WFI transaction, the transaction could abend or have invalid data. If the recommendation engine 126 determines that the transaction is re-entrant, then the transaction is processed for further analysis to determine if the transaction should be scheduled as a WFI transaction.

The recommendation engine 126 determines whether or not the transaction is re-entrant by comparing the program schedule count 312 metric to the transaction execution count 314 metric. If the program schedule count 312 metric is less than the transaction execution count 314 metric, then the transaction is re-entrant and is processed by the recommendation engine 126 for further analysis. If the program schedule count 312 metric is not less than the transaction execution count 314 metric, then the transaction may not be re-entrant, and the recommendation engine 126 excludes the transaction from further analysis. In this manner, a transaction with an execution count of past transactions successfully executing without abending are processed by the recommendation engine 126 for further analysis.

More specifically, to find the re-entrant program not running as WFI or P-WFI, the recommendation engine 126 may perform the following steps:

a) build tables for WFI and non-WFI transactions;
b) from the table of non-WFI transactions (a) identify the re-entrant program by determining the program schedule count 312 that is less than the transaction execution count 314;
c) calculate the average transaction count of the non-WFI transactions, where: Average transaction count=(Total non-WFI (a) transaction execution count 314) divided by the count of unique non-WFI transactions from (a) above); and
d) filter out transactions that are not re-entrant or have transaction execution count 314 less than the average transaction count calculated in (c) above from the tables (a) above.

With the above process, the recommendation engine 126 identifies the data of re-entrant transactions that are able to be scheduled as WFI or regions as running P-WFI and that have a transaction count greater than the average transaction count. The shortlist of transactions that are re-entrant is further processed for WFI or P-WFI scheduling (214).

The scheduler 114 further evaluates the list of re-entrant transactions because not all of the re-entrant transactions should be scheduled as WFI or for running in a P-WFI region. The recommendation engine 126 evaluates if the transaction volume of the re-entrant transactions is greater than the average volume of non-WFI transactions (216). If this transaction volume is greater than the average volume of non-WFI transactions, then the transaction remains on the shortlist of transactions for WFI or P-WFI scheduling (218). If this transaction volume is not greater than the average volume of non-WFI transactions, then the transaction is removed from the list and the transaction is excluded from further analysis (220). In this manner, low volume transactions as compared to other transactions are removed from the list and are not considered for further analysis.

For example, if the average volume of non-WFI transactions is 1000 transactions and the transaction volume for a class of transactions in the report is equal to 1000 transactions, then that transaction class is excluded from being designated or marked as a WFI transaction or for running in a P-WFI region. In this example, if the transaction volume for a class of transactions in the report is greater than 1000 transaction, then that transaction remains on the list for further processing for designation or marking as a WFI transaction or for running in a P-WFI region.

After filtering the CSV report 300 based on the above criteria (already WFI, re-entrant, and volume) up to the end of the transactions on the PRSPGSCH report (222), the remaining shortlisted transactions are eligible for WFI or for P-WFI region scheduling (224) by the scheduler 114. Continuing on to FIG. 2B, one of the system benchmarks described above may be applied to this list of transactions. The system benchmark considered is the percent of transactions to be considered for reassignment (204). As discussed above, this system benchmark may be input by a user, such as a system programmer, or may be a default benchmark. First, the recommendation engine 126 considers the data in the table created above in a) in descending order on transaction execution count field 314. Then, the recommendation engine 126 applies the system benchmark. If the system benchmark is not provided by a user, then a default system benchmark may be applied. For example, in some implementations a default system benchmark of 25% of transactions that should be scheduled as WFI may be applied. In some implementations, the default system benchmark may be a different percentage such as, for example, a percent anywhere in the range of from 1% to 100%. In some implementations, the default system benchmark is configurable and/or may be dynamically adjusted through machine learning techniques. In some implementations, the user input and/or the default system benchmark may be iteratively changed over time, taking into account varying loads and time of day.

After applying the system benchmark input, the recommendation engine 126 generates a shortlist of top transactions based on the total number of transactions executed on the IMS system (226). In some implementations, if no system benchmark is applied, a default minimum number of the top transactions are placed on the shortlist. For example, the default benchmark of 25% of transactions or the minimum of the top 5 transactions may be considered to determine the transactions that will be considered to be scheduled under exclusive class and IMS region (226). Using the data from the table created above in a), the recommendation engine 126 finds the top percentage set for recommendation to run as WFI transaction and the rest of the transactions can be scheduled for running in a P-WFI region.

Next, the recommendation engine 126 identifies if any other transactions are assigned to the same class as the class to which the shortlisted transactions are assigned (228). If the recommendation engine 126 does find that the shortlisted transactions need to be assigned to the new class in order to run WFI transaction in a dedicated region, the class reassignment flag is marked as 'Y' on the recommendation report for such transactions (230). If the recommendation engine 126 does not find any other transactions assigned to the same class, then this transaction is the only transaction assigned to the class, and the reassignment flag is marked "N" on the recommendation report for such transactions (232). This process is repeated for all transactions in the table. Since WFI transactions require a dedicated class, each transaction with class reassignment value 'Y' on the report will be assigned a new class.

The recommendation engine 126 merges transactions that remain in the same class and transactions that have been reassigned to a new or different class (234).

Continuing on to FIG. 2C, the recommendation engine 126 then verifies whether the transaction accesses the Db2 database subsystem (236) by checking the value on the CVS report 300. For transactions that access the Db2 database, then the scheduler 114 flags these transactions as strongly recommended to be scheduled as WFI transactions (238) and sets the access flag on the recommendation report to 'Y'. There is a high overhead in scheduling transactions that access the Db2 database. These transactions are strongly recommended to be scheduled as WFI or for running in a P-WFI region because the transaction response time would be improved significantly. For transactions that do not access the Db2 database, then the recommendation engine 126 sets the Db2 access flag on the recommendation report to 'N' or, in some implementations, leaves the access flag blank and regular rescheduling is recommended (240).

The recommendation engine 126 then considers the second system benchmark regarding the maximum region occupancy of a dedicated region running a WFI transaction or dedicate a region for running as P-WFI (204). This system benchmark may be input by a user, such as a system programmer, or may be dynamically input from a separate machine learning process. In some implementations, the system benchmark may use a default value. In some implementations, the default value may be, for example, 50% for maximum region occupancy of a WFI MPR from among MPRs 118*a*-118*n*. It is understood that this default value is configurable and may be changed to any other percentage.

The recommendation engine 126 determines the region occupancy for the transaction by calculating the total number of dedicated regions required for each transaction (242).

The recommendation engine 126 calculates the total number of dedicated regions required for each transaction. The dedicated regions required are equal to the total region occupancy of transactions divided by the region threshold, for a minimum of two dedicated regions (242). The resulting number may be rounded to higher number regions required.

In some implementations, the scheduler 114 then outputs a recommendation report for the top transactions to be scheduled as WFI including the Db2 access flag and class reassignment required flag (244). The recommendation report may be in various different formats. The recommendation report will be in two formats with one format a) illustrated in FIG. 4 in a summary tabular format with an example summary recommendation illustrated in FIG. 5; and the other format b) illustrated in FIG. 6 as a report listing actions required to implement recommendations, which may be for automatic scheduling and implementing. In some implementations, a user may select which transactions identified and recommended by the scheduler 114 to process by the IMS system as recommended.

For example, table 400 of FIG. 4 illustrates an output from the recommendation engine 126. The table 400 includes 1. a dedicated region flag; 2. a transaction name; 3. a program name; 4. class with Class ID; 5. a Db2 access flag; 6. a reassign class flag; 7. a schedule time percent of total response time; and 8. a number of dedicated regions recommended.

In a similar manner, the table 500 of FIG. 5 provides similar information as the table 400 of FIG. 4, but in a different format along with some additional information. Table 500 includes a column for a recommended dedicated region for the transaction. Other columns in table 500 include transaction name (TRAN NAME), program name (PGM NAME), class, Db2 Access flag, class reassignment recommended flag, recommended number of dedicated regions, the program schedule number (PGM SCH #), the number of regions (RGN), the total region occupancy, the schedule time percent, the total number of CPU cycles until 1st DLI CPU call, the total time until $1^{st}$ DLI time call, the total response time, and the number of transactions (TRAN #).

The table 600 in FIG. 6 lists the actions required to implement recommendations, which may be for automatic scheduling and implementing.

In some implementations, the recommendation engine 126 automatically defines the transactions on the recommendation report starting with the transactions at the top of the report as WFI or for running in a P-WFI region in the IMS TM 102.

Response time of IMS transactions is a very critical performance criterion for in the IMS TM 102. Various factors impact response time of IMS transactions, such as transaction queuing, program scheduling, program execution, IMS database access, Db2 access, double-ended queue (deque) time, etc. Tuning of transaction scheduling is one of the ways to improve response time. Scheduling transaction as WFI or running in a P-WFI region can significantly reduce the schedule to first DLI time, improving overall response time of the transactions. Identifying transactions impacted due to large number of transactions assignment to a miscellaneous class can be a very time consuming and cumbersome task. The below process illustrated in FIG. 7, in connection with the IMS system 100 of FIG. 1, can help IMS administrators to identify impacted transactions and reassign the impacted transactions to improve transaction response time and reduce CPU usage.

Figure 7:
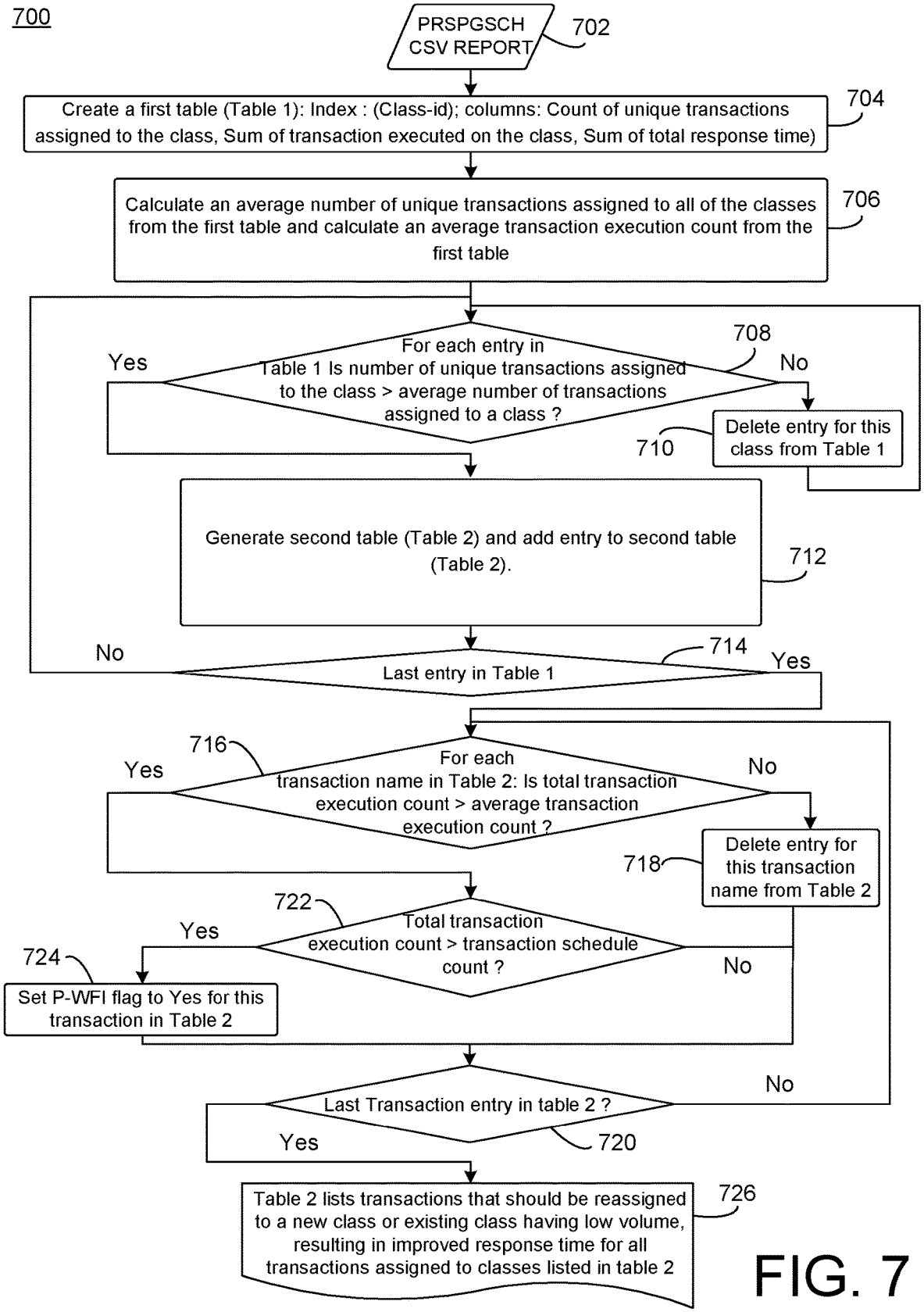
FIG. 7 is an example flow diagram of a process for isolating IMS transactions to the P-WFI region using the system of FIG. 1.

FIG. 7 is an example flow diagram of a process 700 for isolating IMS transactions to a P-WFI region using the system of FIG. 1. Process 700 is a computer-implemented method that may be implemented by the IMS TM 102 and its components, including the recommendation engine 126. Instructions and/or executable code for the performance of process 700 may be stored in the at least one memory 134, and the stored instructions may be executed by the at least one processor 136. Process 700 is also illustrative of a computer program product that may be implemented by the IMS TM 102 and its components.

The PRSPGSCH CSV report (702) is used as an input for the process 700. That is, the recommendation engine 120 may receive a transaction report from a log dataset, where the transaction report is the PRSPGSCH CSV report (702). As discussed in detail above, an example PRSPGSCH CSV report 300 is illustrated in FIG. 3.

Process 700 uses the PRSPGSCH CSV report 300 to create a first table (Table 1) (704) of class identifiers (IDs), count of unique transactions that are assigned to a class, sum of transactions executed on the class, and sum of total response time (704). The first table (Table 1) 800 also may be referred to as a first listing of the transactions as indexed by the class ID for each class of transactions. FIG. 8 is an example first table 800 created as part of the process 700 of FIG. 7.

The first table (Table 1) 800 includes a Class ID 802, a count or number of unique transactions assigned to the class 804, the sum of transaction execution count for this class 806, and the sum of total response time in seconds (808). In this example, there are a total of five different classes listed in the Class ID 802 column.

Process 700 includes calculating an average number of unique transactions assigned to all of the classes from the first table and calculating an average transaction execution count from the first table (706). The average number of unique transactions assigned to a class is the total number of unique transactions executed in the IMS system divided by the total number of active classes. From the first table (Table 1) 800, the total number of classes is the number of different class IDs 802, five, and the total number of unique transactions assigned to the IMS system is the sum, across all classes, of the count of unique transactions assigned to the class 804, which is thirty-six. In the example of the first table (Table 1) 800, the average number of unique transactions assigned to all of the classes=36/5=7.2.

The average transaction execution count is also calculated, where the average transaction execution count is equal to the total number of transaction execution count divided by the total number of unique transactions executed in the IMS system. From the first table (Table 1) 800, the total number of unique transactions assigned to all of the classes is 36, which is obtained by summing the entries in column 804. From the first table (Table 1) 800, the total number of transaction execution count for all classes is equal to 4,050, 919, which is obtained by summing the entries in column 806. Thus, the average transaction execution count is equal to 4,050,919 divided by 36, which is equal to 112525.53.

Process 700 then iterates through each row in the first table (Table 1) 800. For each entry in the first table (Table 1) 800, it is determined whether the number of unique transactions assigned to the class is greater than the average number of transactions assigned to a class (708). If the number of unique transactions assigned to the class is not greater than the average number of transactions assigned to a class, then the entry for this class is deleted from Table 1 (710), and the process moves to the next entry in the first table (Table 1) 800. If the number of unique transactions assigned to the class is greater than the average number of transactions assigned to a class, then a second table (Table 2) is generated, and the entry is added to the second table (Table 2) (712).

For example, with respect to the first entry in the first table (Table 1) 800 having Class ID "Class 1", the number of unique transactions assigned to the class is 8, which is greater than the average number of unique transactions assigned to the class, which is 7.2. Thus, the second table (Table 2) is generated, and Class 1 is added to the second table (Table 2) (712).

FIG. 9 is an example of the second table (Table 2) 900 generated as part of the process 700 of FIG. 7. Each entry in the second table 900 represents a transaction assigned to the class. Class Id 902 and transaction name 904 are the fields/columns used as the index of the second table (Table 2) 900. The columns of the second table (Table 2) 900 also include the total transaction execution count for each transaction name 906, total response time 908, total transaction schedule count 910, and P-WFI flag 912. The second table (Table 2) 900 may be sorted on the total transaction execution count for each transaction name 906 and the total response time 908 in descending order, from top to bottom of the columns 906 and 908.

For example, all of the transactions of Class 1 were added to the second table (Table 2) 900. Each entry in the second table 900 is a different transaction of Class 1 having a different transaction name.

After the second table (Table 2) is generated and the entries are added to the second table (Table 2) (712), process 700 determines if that was the last entry in the first table (Table 1) (714). If that was not the last entry from the first table (Table 1), then the process goes back to the next entry in the first table (Table 1) (708). If that was the last entry from the first table (Table 1) 800, then the process 700 continues to the next step. For example, once all of the transactions of Class 1 are added to the second table (Table 2) 900, process 700 goes to the next entry in the first table (Table 1) 800 and applies the criteria to determine whether the class and its transactions should be added to the second table (Table 2) 900. This is done for each entry in the first table (Table 1) 800.

Once the last entry in the first table (Table 1) 800 is processed, then for each transaction name in the second table (Table 2), process 700 determines if the total transaction execution count for each transaction name is greater than the average transaction execution count (716), where the average transaction execution count was calculated above in 706. If the total transaction execution count for each transaction name 906 is not greater than the average transaction execution count, then the entry for the transaction name is deleted from the second table (Table 2) (718), and the process determines whether this was the last entry in the second table (Table 2) (720). If not, then the next entry is processed.

Step (722) of FIG. 7, determines if the total transaction execution count is greater than the transaction schedule count (722), and if so, then the process determines whether the total transaction execution count for each transaction name 906 is greater than the total transaction schedule count 910. If the total transaction execution count for each transaction name 906 is not greater than the total transaction schedule count 910, then the process determines whether this was the last transaction entry in the second table (Table 2) (720). If the total transaction execution count for each transaction name 906 is greater than the total transaction schedule count 910, then the transaction can be assumed to be reentrant and scheduled in the P-WFI MPRs 118$a$-118$n$ and the P-WFI flag is set to Yes for this transaction in the second table (Table 2) (724). Else, the P-WFI flag 912 is set to No. Once the P-WFI flag 912 is set, the process determines if this was the last transaction entry in the second table (Table 2) (720). The process iterates over each entry in the second table (Table 2) 900 and applies the criteria to determine whether to delete the transaction entry or to keep the transaction entry and set the P-WFI flag 912 to Yes.

Once the last transaction name 904 entry in the second table (Table 2) 900 is processed, then the second table (Table 2) lists the transactions that should be reassigned to a new class, which can run under a P-WFI MPR, or existing class having low volume running under a P-WFI MPR, which results in improved response time for all transactions assigned to the classes listed in the second table (Table 2) (726).

That is, for each class ID and transaction name on the second table (Table 2), the second table (Table 2) is updated to identify one or more of the transactions as candidate transactions for running in a P-WFI region when a total transaction execution count is greater than the average transaction execution count from the first listing and the total transaction execution count is greater than a total transaction schedule count. One way the candidate transactions are identified is by setting the P-WFI flag to Yes, as outlined above. In some implementations, once identified, the candidate transactions may be reassigned to a different class. In some implementations, once identified, the candidate transactions are grouped together and the grouped candidate transactions are assigned to a class for running in the P-WFI region.

FIG. 10 is an example updated second table (Updated Table 2) 1000 created as part of the process of FIG. 7. Updated second table (Updated Table 2) 1000 would represent a snapshot of the transactions that can be reassigned to a different class. Transactions having a P-WFI flag (912) of "Yes" can be grouped together and assigned to a class that can be executed under an MPR from among the MPRs 118$a$-118$n$ to reduce transactions' CPU consumption and response time.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method, the computer-implemented method comprising:
   receiving a transaction report from a log dataset, the transaction report listing multiple transactions including a plurality of metrics for each of the transactions, wherein the plurality of metrics includes a class identifier (ID) for each of the transactions, a transaction execution count, and a total transaction response time;
   generating a first listing of the transactions indexed by the class ID for each class of a plurality of transactions, wherein the first listing includes from the plurality of transactions a count of unique transactions assigned to the class, a sum of the transaction execution count for the class, and a sum of the total transaction response time for the class;
   calculating an average number of unique transactions assigned to all of the classes from the first listing;
   calculating an average transaction execution count from the first listing;
   generating a second listing of the transactions indexed by class ID and transaction name, wherein the second listing includes all of the transactions for the class IDs where the count of unique transactions assigned to the class from the first listing is greater than the average number of unique transactions assigned to all of the classes from the first listing; and
   for each class ID and transaction name on the second listing of the transactions, updating the second listing of the transactions to identify one or more of the transactions as candidate transactions for running in a P-WFI region when a total transaction execution count is greater than the average transaction execution count from the first listing and the total transaction execution count is greater than a total transaction schedule count.

2. The computer-implemented method as in claim 1, further comprising reassigning the candidate transactions to a different class.

3. The computer-implemented method as in claim 1, further comprising:
   grouping the candidate transactions together; and
   assigning the grouped candidate transactions to a class for running in the P-WFI region.

4. The computer-implemented method as in claim 1, wherein calculating the average number of unique transactions assigned to all of the classes from the first listing includes dividing the count of unique transactions assigned to all of the classes by the number of classes.

5. The computer-implemented method as in claim 1, wherein calculating an average transaction execution count from the first listing includes dividing a total number of transaction execution counts for all of the classes divided by the count of unique transactions assigned to all of the classes.

6. The computer-implemented method as in claim 1, wherein generating the second listing of the transactions includes iterating through each of the class of transactions in the first listing of the transactions.

7. The computer-implemented method as in claim 1, further comprising sorting the second listing of the transactions based on transaction response time and the total transaction execution count in descending order.

8. A computer program product, the computer program product being tangibly embodied on a non-transitory computer-readable medium and including executable code that, when executed, is configured to cause a computing device to:
   receive a transaction report from a log dataset, the transaction report listing multiple transactions including a plurality of metrics for each of the transactions, wherein the plurality of metrics includes a class identifier (ID) for each of the transactions, a transaction execution count, and a total transaction response time;

generate a first listing of the transactions indexed by the class ID for each class of a plurality of transactions, wherein the first listing includes from the plurality of transactions a count of unique transactions assigned to the class, a sum of the transaction execution count for the class, and a sum of the total transaction response time for the class;

calculate an average number of unique transactions assigned to all of the classes from the first listing;

calculate an average transaction execution count from the first listing;

generate a second listing of the transactions indexed by class ID and transaction name, wherein the second listing includes all of the transactions for the class IDs where the count of unique transactions assigned to the class from the first listing is greater than the average number of unique transactions assigned to all of the classes from the first listing; and for each class ID and transaction name on the second listing of the transactions, update the second listing of the transactions to identify one or more of the transactions as candidate transactions for running in a P-WFI region when a total transaction execution count is greater than the average transaction execution count from the first listing and the total transaction execution count is greater than a total transaction schedule count.

9. The computer program product of claim 8, further comprising executable code that, when executed, is configured to cause the computing device to reassign the candidate transactions to a different class.

10. The computer program product of claim 8, further comprising executable code that, when executed, is configured to cause the computing device to:
group the candidate transactions together; and
assign the grouped candidate transactions to a class for running in the P-WFI region.

11. The computer program product of claim 8, wherein the executable code that, when executed, causes the computing device to calculate the average number of unique transactions assigned to all of the classes from the first listing by dividing the count of unique transactions assigned to all of the classes by the number of classes.

12. The computer program product of claim 8, wherein the executable code that, when executed, causes the computing device to calculate the average transaction execution count from the first listing by dividing a total number of transaction execution counts for all of the classes divided by the count of unique transactions assigned to all of the classes.

13. The computer program product of claim 8, wherein the executable code that, when executed, causes the computing device to generate the second listing of the transactions by iterating through each of the class of transactions in the first listing of the transactions.

14. The computer program product of claim 8, further comprising executable code that, when executed, causes the computing device to sort the second listing of the transactions based on transaction response time and the total transaction execution count in descending order.

15. A system comprising:
at least one processor; and
a non-transitory computer readable medium comprising instructions that, when executed by the at least one processor, cause the system to implement a recommendation engine that is configured to:
receive a transaction report from a log dataset, the transaction report listing multiple transactions including a plurality of metrics for each of the transactions, wherein the plurality of metrics includes a class identifier (ID) for each of the transactions, a transaction execution count, and a total transaction response time;
generate a first listing of the transactions indexed by the class ID for each class of transactions, wherein the first listing includes a count of unique transactions assigned to the class, a sum of the transaction execution count for the class, and a sum of the total transaction response time for the class;
calculate an average number of unique transactions assigned to all of the classes from the first listing;
calculate an average transaction execution count from the first listing;
generate a second listing of the transactions indexed by class ID and transaction name, wherein the second listing includes all of the transactions for the class IDs where the count of unique transactions assigned to the class from the first listing is greater than the average number of unique transactions assigned to all of the classes from the first listing; and
for each class ID and transaction name on the second listing of the transactions, update the second listing of the transactions to identify one or more of the transactions as candidate transactions for running in a P-WFI region when a total transaction execution count is greater than the average transaction execution count from the first listing and the total transaction execution count is greater than a total transaction schedule count.

16. The system of claim 15, wherein the recommendation engine is further configured to reassign the candidate transactions to a different class.

17. The system of claim 16, wherein the recommendation engine is further configured to:
group the candidate transactions together; and
assign the grouped candidate transactions to a class for running in the P-WFI region.

18. The system of claim 15, wherein the recommendation engine is configured to calculate the average number of unique transactions assigned to all of the classes from the first listing by dividing the count of unique transactions assigned to all of the classes by the number of classes.

19. The system of claim 15, wherein the recommendation engine is configured to calculate the average transaction execution count from the first listing by dividing a total number of transaction execution counts for all of the classes divided by the count of unique transactions assigned to all of the classes.

20. The system of claim 15, wherein the recommendation engine is configured to generate the second listing of the transactions by iterating through each of the class of transactions in the first listing of the transactions.

21. The system of claim 15, wherein the recommendation engine is further configured to sort the second listing of the transactions based on transaction response time and the total transaction execution count in descending order.

\* \* \* \* \*